United States Patent
Lee (10) Patent No.: US 12,368,381 B2
(45) Date of Patent: Jul. 22, 2025

(54) AUTO MODE CHANGE IN BUCK-BOOST CONVERTER

(71) Applicant: NXP B.V., Eindhoven (NL)

(72) Inventor: Jin Hui Lee, Nam-yang-ju-si (KR)

(73) Assignee: NXP B.V., Eindhoven (NL)

( * ) Notice: Subject to any disclaimer, the term of this patent is extended or adjusted under 35 U.S.C. 154(b) by 396 days.

(21) Appl. No.: 18/068,095

(22) Filed: Dec. 19, 2022

(65) Prior Publication Data
US 2024/0204666 A1 Jun. 20, 2024

(51) Int. Cl.
| H02M 3/158 | (2006.01) |
| H02M 1/00 | (2007.01) |
| H02M 1/088 | (2006.01) |
| H02M 3/157 | (2006.01) |

(52) U.S. Cl.
CPC ....... *H02M 3/1582* (2013.01); *H02M 1/0003* (2021.05); *H02M 1/0009* (2021.05); *H02M 1/088* (2013.01); *H02M 3/157* (2013.01); *H02M 3/158* (2013.01)

(58) Field of Classification Search
CPC ............ H02M 1/0003; H02M 1/0009; H02M 1/0012; H02M 1/0032; H02M 1/08; H02M 1/088; H02M 1/32; H02M 3/156; H02M 3/157; H02M 3/158; H02M 3/1582
See application file for complete search history.

(56) References Cited

U.S. PATENT DOCUMENTS

| 8,860,387 B2 | 10/2014 | Kobayashi | |
| 10,250,142 B1 * | 4/2019 | Yang | H02M 3/1582 |

(Continued)

FOREIGN PATENT DOCUMENTS

WO   WO-2009023380 A1   2/2009

OTHER PUBLICATIONS

Leonardo Callegaro et al., "A Simple Smooth Transition Technique for the Noninverting Buck-Boost Converter", IEEE Trans. Power Electron, vol. 33, No. 6, pp. 4906-4915, Jun. 2018.

(Continued)

*Primary Examiner* — Thienvu V Tran
*Assistant Examiner* — Shahzeb K Ahmad (57) ABSTRACT

Various embodiments relate to a buck-boost converter controller configured to control a buck-boost controller, wherein the buck-boost converter has a buck mode of operation, a boost mode of operation, and a buck-boost mode of operation, including: a phase controller configured to produce phase control signals to control switching in the buck-boost converter, wherein the phase control signals are based on a mode of operation of the buck-boost converter; and an automatic mode selector configured to indicate to the phase controller the mode of operation of the buck-boost controller based upon a buck on-time TON_bk or a buck off-time TOFF_bk, a boost on-time TON_bst or a boost off-time TOFF_bst, and a control configuration on-time TPI3, where TON_bk is the on-time during the buck mode of operation, TOFF_bk is the off-time during the buck mode of operation, TON_bst is the on-time during the boost mode of operation, TOFF_bk is the off-time during the boost mode operation, and TPI3 is the time where a second high-side transistor is on and a first low side transistor is on.

20 Claims, 4 Drawing Sheets

(56) References Cited

U.S. PATENT DOCUMENTS

| | | | |
|---|---|---|---|
| 2006/0284606 A1* | 12/2006 | Chen | H02M 1/44 |
| | | | 323/259 |
| 2009/0045786 A1* | 2/2009 | Krellner | H02M 3/1582 |
| | | | 323/259 |
| 2010/0045254 A1* | 2/2010 | Grant | H02M 3/1582 |
| | | | 323/283 |
| 2012/0146594 A1 | 6/2012 | Kobayashi | |
| 2014/0152272 A1 | 6/2014 | Bazzani | |
| 2016/0094125 A1* | 3/2016 | Milanesi | H02M 3/1584 |
| | | | 323/235 |
| 2018/0166990 A1* | 6/2018 | Gibson | H02M 3/158 |
| 2018/0358900 A1* | 12/2018 | Sun | H02M 3/1582 |
| 2020/0373841 A1* | 11/2020 | Xie | H02M 3/1582 |
| 2023/0283168 A1* | 9/2023 | Moretti | H02M 1/0009 |
| | | | 323/271 |

OTHER PUBLICATIONS

Bosheng Sun, "Multimode Control for a Four-Switch Buck-Boost Converter", Texas Instruments, Analog Design Journal, 1Q 2019.

* cited by examiner

AUTO MODE CHANGE IN BUCK-BOOST CONVERTER

TECHNICAL FIELD

Various exemplary embodiments disclosed herein relate generally to Auto mode change in buck-boost converter.

BACKGROUND

Buck-boost DC to DC converters are used to convert an input DC voltage to an output DC voltage. When the input voltage Vin is greater than the output voltage Vout, the buck-boost converter is operating in buck mode. When Vin is less than Vout, the buck-boost converter is operation in boost mode. When Vin is approximately the same as Vout, then the buck-boost converter operates in the buck-boost mode.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a buck-boost converter controller configured to control a buck-boost controller, wherein the buck-boost converter has a buck mode of operation, a boost mode of operation, and a buck-boost mode of operation, including: a phase controller configured to produce phase control signals to control switching in the buck-boost converter, wherein the phase control signals are based on a mode of operation of the buck-boost converter; and an automatic mode selector configured to indicate to the phase controller the mode of operation of the buck-boost controller based upon a buck on-time TON_bk or a buck off-time TOFF_bk, a boost on-time TON_bst or a boost off-time TOFF_bst, and a control configuration on-time TPI3, wherein TON_bk is an on-time during the buck mode of operation, TOFF_bk is the off-time during the buck mode operation, TON_bst is an on-time during the boost mode of operation, TOFF_bk is the off-time during the boost mode operation, and TPI3 is a time where a second high-side transistor is on and a first low side transistor is on.

Various embodiments are described, wherein the automatic mode selector is configured to indicate a change from the buck mode to the buck-boost mode when TON_bk is greater than a buck mode threshold or TOFF_bk is less than the buck mode threshold.

Various embodiments are described, wherein the automatic mode selector is configured to indicate a change from the boost mode to the buck-boost mode when TON_bst is less than a boost mode threshold or TOFF_bk is greater than the boost mode threshold.

Various embodiments are described, wherein the automatic mode selector is configured to indicate a change from the buck-boost mode to the buck mode when TPI3 is greater than a first buck-boost mode threshold.

Various embodiments are described, wherein the automatic mode selector is configured to indicate a change from the buck-boost mode to the boost mode when TPI3 is less than a second buck-boost mode threshold.

Various embodiments are described, wherein the automatic mode selector is configured to: indicate a change from the buck mode to the buck-boost mode when TON_bk is greater than a buck mode threshold or TOFF_bk is less than the buck mode threshold; indicate a change from the boost mode to the buck-boost mode when TON_bst is less than a boost mode threshold or TOFF_bst is greater than the boost mode threshold; indicate a change from the buck-boost mode to the buck mode when TPI3 is greater than a first buck-boost mode threshold; and indicate a change from the buck-boost mode to the boost mode when TPI3 is less than a second buck-boost mode threshold.

Various embodiments are described, further including: a TON_bk generator configured to generate a value of TON_bk based upon an input voltage (Vin) of the buck-boost controller and an output voltage (Vout) of the buck-boost controller; and a TON_bst generator configured to generate a value of TON_bst based upon Vin and Vout.

Further various embodiments relate to a buck-boost converter having a buck mode of operation, a boost mode of operation, and a buck-boost mode of operation, including: an H-bridge including a first high-side transistor (HS1), a first low-side transistor (LS1), a second high-side transistor (HS2), and a second low-side transistor (LS1); a first driver configured to drive HS1 and LS1; a second driver configured to drive HS2 and LS2; a phase controller configured to produce phase control signals including a first driver control signal and a second driver control signal to control switching of HS1, LS1, HS2, and LS2, wherein the phase control signals are based on a mode of operation of the buck-boost converter; and an automatic mode selector configured to indicate to the phase controller the mode of operation of the buck-boost controller based upon a buck on-time TON_bk or a buck off-time TOFF_bk, a boost on-time TON_bst or a boost off-time TOFF_bst, and a control configuration on-time TPI3, wherein TON_bk is an on-time during the buck mode of operation, TOFF_bk is the off-time during the buck mode operation, TON_bst is an on-time during the boost mode of operation, TOFF_bk is the off-time during the boost mode operation, and TPI3 is a time where a HS2 is on and a LS1 is on.

Various embodiments are described, wherein the automatic mode selector is configured to indicate a change from the buck mode to the buck-boost mode when TON_bk is greater than a buck mode threshold or TOFF_bk is less than the buck mode threshold.

Various embodiments are described, wherein the automatic mode selector is configured to indicate a change from the boost mode to the buck-boost mode when TON_bst is less than a boost mode threshold of TOFF_bst is greater than the boost mode threshold.

Various embodiments are described, wherein the automatic mode selector is configured to indicate a change from the buck-boost mode to the buck mode when TPI3 is greater than a first buck-boost mode threshold.

Various embodiments are described, wherein the automatic mode selector is configured to indicate a change from the buck-boost mode to the boost mode when TPI3 is less than a second buck-boost mode threshold.

Various embodiments are described, wherein the automatic mode selector is configured to: indicate a change from the buck mode to the buck-boost mode when TON_bk is greater than a buck mode threshold or TON_bk is less than the buck mode threshold; indicate a change from the boost mode to the buck-boost mode when TON_bst is less than a boost mode threshold or TOFF_bst is greater than the boost mode threshold; indicate a change from the buck-boost mode to the buck mode when TPI3 is greater than a first buck-boost mode threshold; and indicate a change from the buck-boost mode to the boost mode when TPI3 is less than a second buck-boost mode threshold.

Various embodiments are described, further including: a TON_bk generator configured to generate a value of TON_bk based upon an input voltage (Vin) of the buck-boost controller and an output voltage (Vout) of the buck-boost controller; and a TON_bst generator configured to generate a value of TON_bst based upon Vin and Vout.

Further various embodiments relate to a method for controlling a buck-boost converter, wherein the buck-boost converter has a buck mode of operation, a boost mode of operation, and a buck-boost mode of operation, including: producing phase control signals, by a phase controller, to control switching in the buck-boost converter, wherein the phase control signals are based on a mode of operation of the buck-boost converter; and indicating to the phase controller the mode of operation of the buck-boost controller based upon a buck on-time TON_bk or a buck off-time TOFF_bk, a boost on-time TON_bst or a boost off-time TOFF_bst, and a control configuration on-time TPI3, wherein TON_bk is an on-time during the buck mode of operation, TOFF_bk is the off-time during the buck mode operation, TON_bst is an on-time during the boost mode of operation, TOFF_bk is the off-time during the boost mode operation, and TPI3 is a time where a second high-side transistor is on and a first low side transistor is on.

Various embodiments are described, further includes indicating a change from the buck mode to the buck-boost mode when TON_bk is greater than a buck mode threshold or TOFF_off is less than the buck mode threshold.

Various embodiments are described, further includes indicating a change from the boost mode to the buck-boost mode when TON_bst is less than a boost mode threshold or TOFF_bst is greater than the boost mode threshold.

Various embodiments are described, further includes indicating a change from the buck-boost mode to the buck mode when TPI3 is greater than a first buck-boost mode threshold.

Various embodiments are described, further includes indicating a change from the buck-boost mode to the boost mode when TPI3 is less than a second buck-boost mode threshold.

Various embodiments are described, further including: indicating a change from the buck mode to the buck-boost mode when TON_bk is greater than a buck mode threshold or TOFF_bk is less than the buck mode threshold; indicating a change from the boost mode to the buck-boost mode when TON_bst is less than a boost mode threshold or TON_bst is greater than the boost mode threshold; indicating a change from the buck-boost mode to the buck mode when TPI3 is greater than a first buck-boost mode threshold; and indicating a change from the buck-boost mode to the boost mode when TPI3 is less than a second buck-boost mode threshold.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Buck-boost DC to DC converters are used to convert an input DC voltage to an output DC voltage. When the input voltage Vin is greater than the output voltage Vout, the buck-boost converter is operating in buck mode. When Vin is less than Vout, the buck-boost converter is operation in boost mode. When Vin is approximately the same as Vout, then the buck-boost converter operates in the buck-boost mode. For example, when a battery is used to power a system, the battery voltage may be higher than the voltage needed to power the system. So, a buck-boost converter will operate in buck mode. But overtime the voltage output of the battery drops. It may drop to nearly the same voltage as the voltage used to power the system. In this situation the buck-boost converter will operate in buck-boost mode. Eventually, the voltage output of the battery will drop below the voltage used to power the system. In this situation the buck-boost converter will operate in the boost mode. Accordingly, automatically selecting and controlling the mode of the buck-boost converter will allow the buck-boost converter to provide the needed output voltage Vout as the input voltage Vin varies. Embodiments of how to automatically control the mode of buck-boost converter will be described herein.

Figure 1:
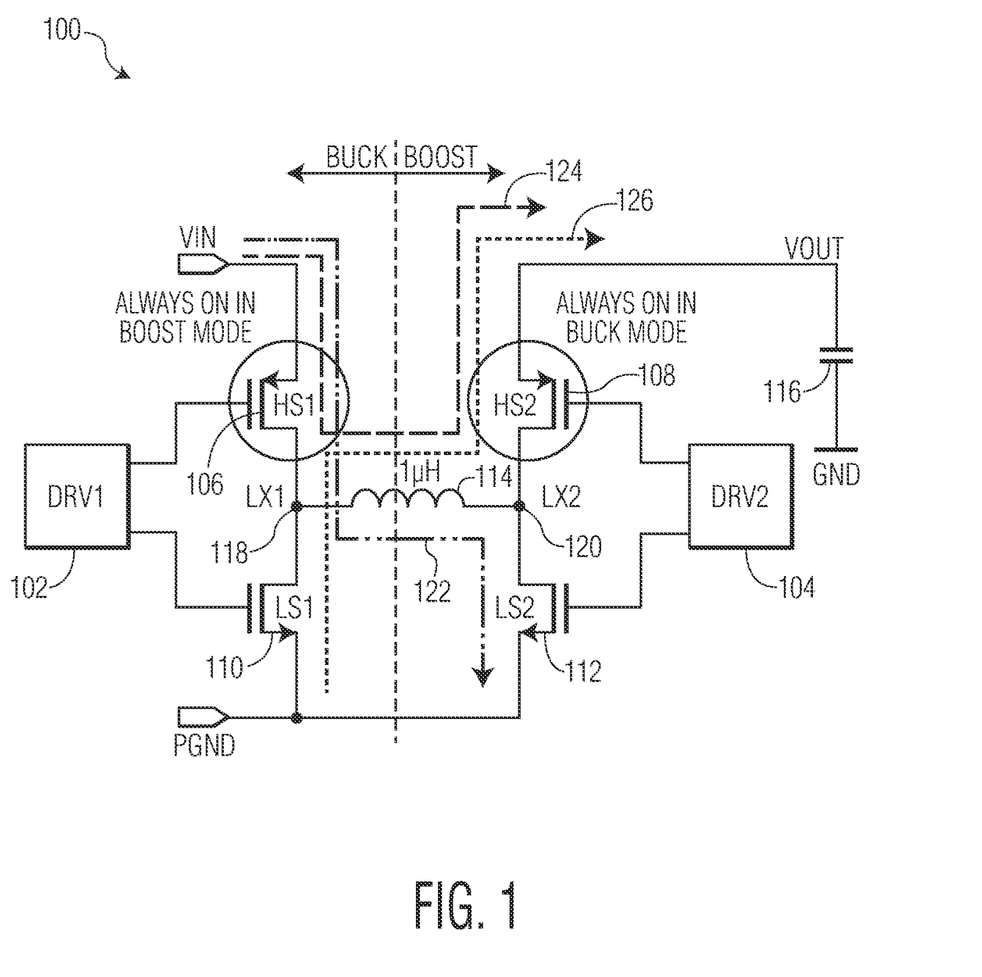
FIG. 1 illustrates a circuit diagram for a buck-boost converter.

To provide constant system power rail from wide range of input voltages, an H-bridge type buck-boost converter is widely used. FIG. 1 illustrates a circuit diagram for a buck-boost converter. The buck-boost converter 100 includes four switching transistors connected by an inductor 114 to form the H-bridge. One leg of the H includes switching transistor HS1 106 and switching transistor LS1 110. Switching transistor HS1 106 is designated the first high-side transistor as it connects to the input voltage. Switching transistor LS1 110 is designated the first low-side transistor as it connects to the ground on the input side of the H-bridge. The other leg of the H includes switching transistor HS2 108 and switching transistor LS2 112. Switching transistor HS2 108 is designated the second high-side transistor as it connects to the output voltage. Switching transistor LS2 112 is designated the second low-side transistor as it connects to the ground on the output side of the H-bridge. The inductor 114 is connected between node LX1 118 and node LX2 120. Node LX1 118 is between switching transistor HS1 106 and switching transistor LS1 110. Node LX2 120 is between switching transistor HS2 108 and switching transistor LS2 112.

Driver DRV1 102 and driver DRV2 104 control the operation of the switching transistors. Driver DRV1 102 provides control signals to the gates of switching transistor HS1 106 and transistor LS1 110. Driver DRV2 104 provides control signals to the gates of switching transistor HS2 108 and switching transistor LS2 112. In the buck-boost converter 100 the switching transistor HS1 106 is a P-channel metal-oxide semiconductor (PMOS) transistor and the switching transistor LS1 110 is a N-channel metal-oxide semiconductor (NMOS) transistor. The same is true for switching transistor HS2 108 and switching transistor LS2 112. Note, that in other embodiments all of the switching transistors may be PMOS or NMOS or a combination thereof.

The output Vout is connected to ground via capacitor 116. This has the effect of smoothing the voltage that results from the switching of the switching transistors into the output DC voltage Vout.

Figure 2:
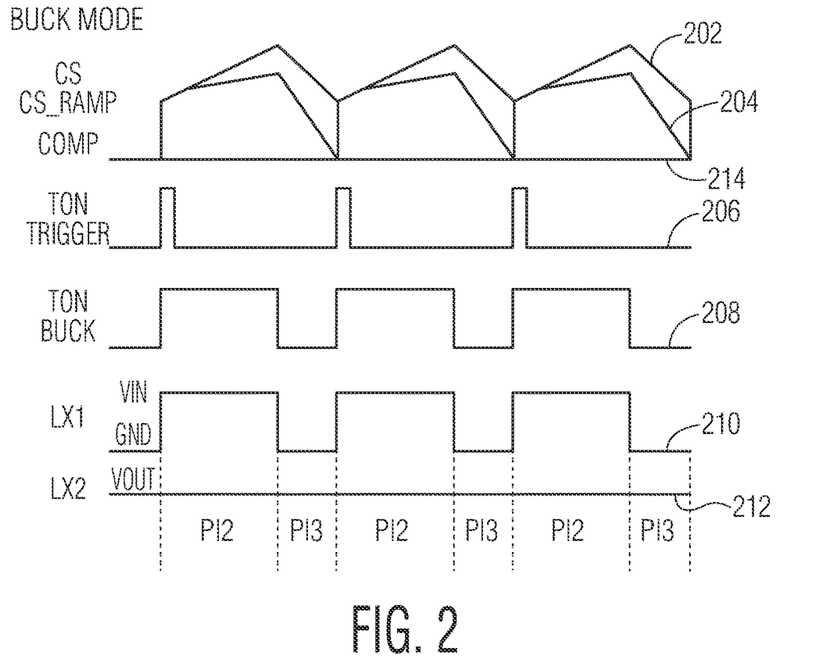
FIG. 2 illustrates plots of various control and other signals found in the buck-boost converter during buck mode operation.

First the buck mode operation of the buck-boost converter 100 will be described. FIG. 2 illustrates plots of various control and other signals found in the in the buck-boost converter during buck mode operation. The TON TRIGGER 206 signal starts a TON counter as shown by TON BUCK 208. The TON TRIGGER 206 may be generated by a comparator that compares Vout to a specified reference value. Along the bottom of FIG. 2, various control signal configurations are illustrated. In this example PI2 and PI3 are illustrated. The control configurations PI2 and PI3 have associated on-times of TPI2 and TPI3 respectively. During PI2 switching transistor HS1 106 and switching transistor HS2 108 are on leading to a current path 124. Then once the TOn-timer reaches its limit corresponding to the desired on-time of switching transistor HS1 106 and switching transistor HS2 108, TON BUCK 208 goes low and PI3 starts, and during PI3 switching transistor HS2 108 and switching transistor LS1 110 are on. Note, that during buck mode switching transistor HS2 108 is always on. Plot CS 202 indicates the current sensed at the inductor 114 (see FIG. 6). Plot CS_RAMP 204 indicates the current sensed plus a ramp (see FIG. 6). Plot COMP 214 indicates the difference between a feedback voltage based on Vout and a reference voltage Vref (see FIG. 6). The plot of LX1 voltage 210 illustrates how the voltage at node LX1 118 alternates between Vin and ground depending on the control configuration of either PI2 or PI3. The voltage at node LX2 120 remains constant at Vout. The length of the on-time indicated by TON BUCK 208 affects the value of Vout. The longer the on-time, the higher Vout.

Figure 3:
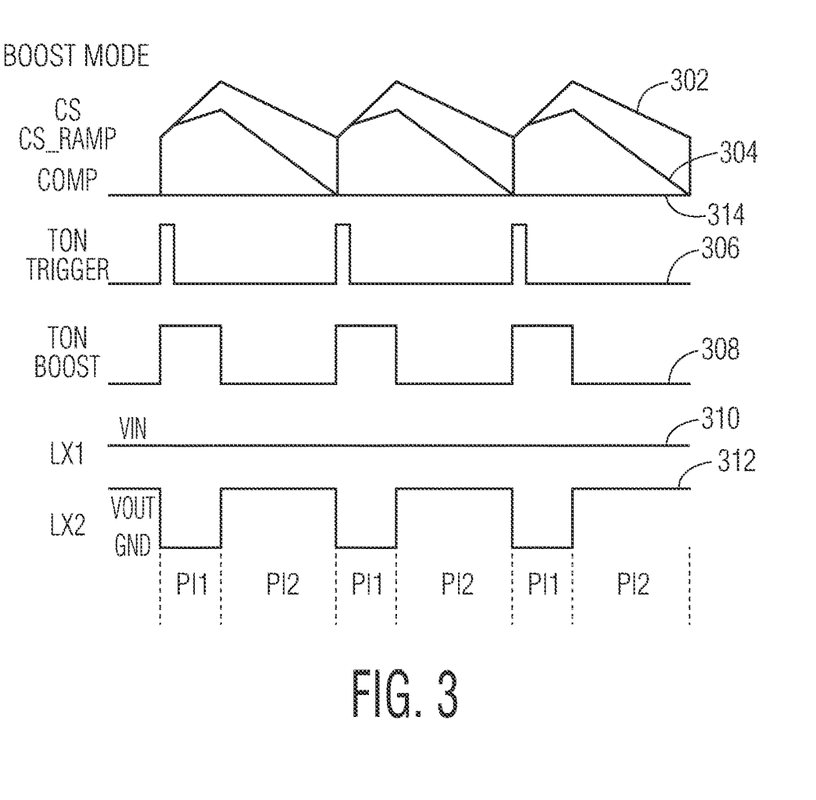
FIG. 3 illustrates plots of various control and other signals found in the buck-boost converter during boost mode operation.

Next the boost mode operation of the buck-boost converter 100 will be described. FIG. 3 illustrates plots of various control and other signals found in the buck-boost converter during boost mode operation. The TON TRIGGER 306 signal starts a TON timer as shown by TON BOOST 308. Again, the TON TRIGGER 306 may be generated by a comparator that compares Vout to a specified reference value. Along the bottom of FIG. 3, various control signal configurations are illustrated. In this example PI1 and PI2 are illustrated. The control PI1 has an associated on-time TPI1. During PI1 switching transistor HS1 106 and switching transistor LS2 112 are on leading to current path 122. During PI2 switching transistor HS1 106 and switching transistor HS2 108 are on leading to a current path 124. Then once the TON counter reaches its limit corresponding to the desired on-time of switching transistor HS1 106 and switching transistor LS2 112, TON BOOST 308 goes low and PI2 starts, and during PI2 switching transistor HS1 106 and switching transistor HS2 108 are on. Note, that during boost mode switching transistor HS1 106 is always on. Plot CS 302 indicates the current sensed at the inductor 114 (see FIG. 6). Plot CS_RAMP 304 indicates the current sensed plus the ramp (see FIG. 6). Plot COMP 314 indicates the difference between a feedback voltage based on Vout and a reference voltage Vref (see FIG. 6). The plot of LX1 voltage 310 illustrates how the voltage at node LX1 118 remains at Vin. The plot of LX2 voltage 312 illustrates how the voltage at node LX2 120 alternates between Vout and ground. The length of the on-time indicated by TON BOOST 308 affects the value of Vout. The longer the on-time, the higher Vout.

Figure 4:
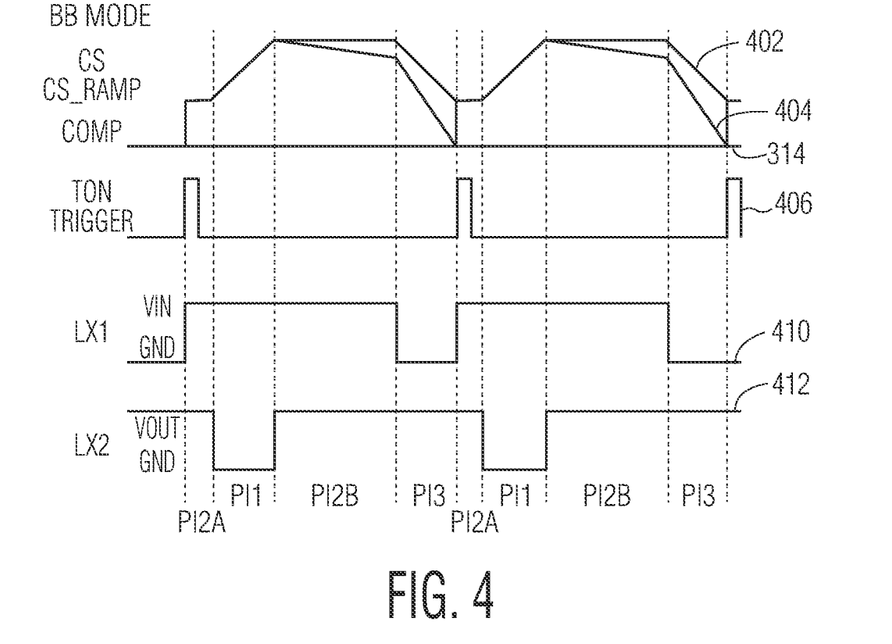
FIG. 4 illustrates plots of various control and other signals found in the buck-boost converter during buck-boost mode operation.

Next the buck-boost mode operation of the buck-boost converter 100 will be described. FIG. 4 illustrates plots of various control and other signals found in the in the buck-boost converter during buck-boost mode operation. The TON TRIGGER 306 signal restarts operating cycle of the buck-boost operation. Again, the TON TRIGGER 406 may be generated by a comparator that compares Vout to a specified reference value. Along the bottom of FIG. 4, various control signal configurations are illustrated. In this example PI2A, PI1, PI2B, and PI3 are illustrated. Control signals PI2A and PI2B have associated on-times of TPI2A and TPI2B. During PI2A switching transistor HS1 106 and switching transistor HS2 108 are briefly on to begin the cycle. Then during TPI1 switching transistor HS1 106 and switching transistor LS2 112 are on leading to current path 122. During PI2B switching transistor HS1 106 and switching transistor HS2 108 are on leading to a current path 124. Then during PI3 switching transistor HS2 108 and switching transistor LS1 110 are on leading to current path 126. Plot CS 402 indicates the current sensed at the inductor 114 (see FIG. 6). Plot CS_RAMP 204 indicates the current sensed plus a ramp (see FIG. 6). Plot COMP 214 indicates the difference between a feedback voltage based on Vout and a reference voltage Vref (see FIG. 6). The plot of LX1 voltage 410 illustrates how the voltage at node LX1 118 alternates between Vin and ground. The plot of LX2 voltage 412 illustrates how the voltage at node LX2 120 alternates between Vout and ground. The length of the on-time indicated by PI1, PI2A, PI2B, and PI3 affect the value of Vout.

The following equation describes the relationship of Vout to Vin:

$$Vout = \frac{D_{bk}}{1 - D_{bst}} Vin, \quad \text{(equation 1)}$$

where $D_{bk}$ is the buck mode duty cycle and $D_{bst}$ is the boost mode duty cycle. So, in the buck mode $D_{bst}$ is zero so the equation becomes:

$$Vout = D_{bk} \cdot Vin,$$

which means that $$\text{Ton\_bk} = \frac{Vout}{Vin} Tperiod.$$

In the boost mode $D_{bk}$ is 1 so the equation becomes:

$$Vout = \frac{1}{1 - D_{bst}} Vin,$$

which means that $$\text{Ton\_bst} = \frac{Vout - Vin}{Vout} Tperiod.$$

Figure 5:
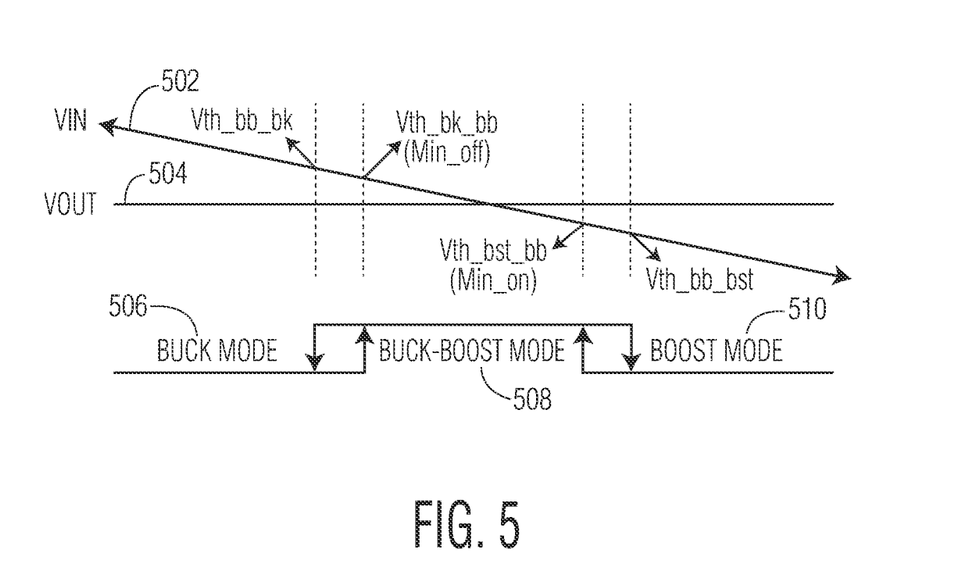
FIG. 5 illustrates the relationship between Vin and Vout using automatic changes between modes.

FIG. 5 illustrates the relationship between Vin and Vout using automatic changes between modes. As shown in FIG. 5, in the buck mode 506, Vin 502 is greater than Vout 504. In the boost mode 510, Vin 502 is less than Vout 504. In the buck-boost mode 508, Vin 502 and Vout 504 are nearly equal. The boundary between buck-boost mode 508 and buck mode 506 and the boundary between buck-boost mode 508 and boost mode 510 have some hysteresis. That is the transition from buck-boost mode 508 and to buck-boost mode 508 do not occur at the same time and create an overlap time period where the mode being used depends on the direction of the transition between the mode. The hysteresis between buck mode 506 and buck-boost mode 508 may be based on the Vin voltage levels of Vth_bb_bk and Vth_bk_bb. Vth_bk_bb may be determined based up a minimum off-time of the buck mode. The hysteresis between buck-boost mode 508 and boost mode 510 may be based on the Vin voltage levels of Vth_bb_bst and Vth_bst_bb. Vth_bst_bb may be determined by a minimum on-time of the boost mode.

Now a method for automatically changing the mode of the buck-boost converter 100 will be described. As the Ton for buck mode and Ton for boost mode is adaptively adjusted to have the same frequency for all of the Vin and Vout conditions the following holds:

$$\text{Ton\_bk} = (Vout/Vin) \times Tperiod; \text{ and}$$

$$\text{Ton\_bst} = ((Vout - Vin)/Vout) \times Tperiod.$$

For a buck mode to buck-boost mode change, if Vin ramps down and the off-time is reduced to minimum off-time, the buck-boost converter 100 changes mode from the buck mode to the buck-boost mode. If Tmin_off (minimum off-time) is set to 10% of Tperiod and it is determined that the off-time is less than 10% of Tperiod, the mode change threshold is $$\text{Ton\_bk} = 0.9 \times Tperiod = (Vout/Vin) \times Tperiod, \text{ and}$$

$$Vin(bk \text{ to } bb) = \sim 1.111 \times Vout.$$

For a boost mode to buck-boost mode change, if Vin ramps up and the on-time is reduced to minimum on-time and the off-time is longer than the threshold, the buck-boost converter 100 changes mode from the boost mode to the buck-boost mode. If Tmin_on (minimum on-time) is set to 10% of Tperiod and it is determined that the off-time is longer than 90% of Tperiod, then the mode change threshold is $$\text{Ton\_bst} = 0.1 \times Tperiod = (Vout - Vin)/Vout \times Tperiod, \text{ and}$$

$$Vin(bst \text{ to } bb) = \sim 0.9 \times Vout.$$

For the buck boost mode to buck mode or boost mode change, equation 1 defines the relationship between Vin and Vout during the buck boost mode. Dbk is defined as:

$$D_{bk} = \frac{T_{PI2A} + T_{PI1} + T_{PI2B}}{T_{sw}},$$

Dbst is defined as:

$$D_{bst} = \frac{T_{PI1}}{T_{sw}},$$

where $$T_{sw} = T_{PI2A} + T_{PI1} + T_{PI2B} + T_{PI3}.$$

By inserting the equations for Dbk and Dbst into equation 1, the following equation results:

$$Vin = \frac{T_{PI2A} + T_{PI2B} + T_{PI3}}{T_{PI2A} + T_{PI1} + T_{PI2B}} Vout = x \times Vout. \quad \text{(equation 2)}$$

During operation of the buck-boost converter 100 if the times TPI2A, TPI1, and TPI2B are set to a constant value, then the threshold for switching between different modes may be detected based upon measuring TPI3. For example, if TPI2A=25 ns, TPI1=110 ns, TPI2B=400 ns the following threshold values for TPI3 for changing between modes may be determined as follows. For the mode change from buck-boost mode to buck mode, if TPI3 is longer than 200 ns, then Vin (bb to bk) for buck-boost mode to buck mode threshold from equation 2 is:

$$Vin(bb \text{ to } bk) = 1.168 \times Vout$$

For the mode change from buck-boost mode to buck mode, if TPI3 is shorter than 20 ns, then Vin (bb to bst) for buck-boost mode to boost mode threshold from equation 2 is:

$$Vin(bb \text{ to } bst) = 0.832 \times Vout$$

In summary, by monitoring the specific switching time duration values of Ton_bk, Ton_bst, and TPI3 in the various modes, the mode may be automatically changed to meet specific Vin and Vout conditions with hysteresis for stability.

The voltage relationships in transitioning between the buck mode and buck-boost mode that are used to set time thresholds in the above example are:

$$Vin(bk \text{ to } bb) = \sim 1.111 \times Vout; \text{ and}$$

$$Vin(bb \text{ to } bk) = 1.168 \times Vout.$$

This results in a hysteresis of 0.057×Vout.

The voltage relationships in transitioning between the buck-boost and boost mode are:

$$Vin(bst \text{ to } bb) = \sim 0.9 \times Vout; \text{ and}$$

$$Vin(bb \text{ to } bst) = 0.832 \times Vou.$$

This results in a hysteresis of 0.068×Vout.

In the above examples, certain threshold values were selected for the values Ton_bk, Ton_bst, and TPI3, but other values may be selected as well. It is noted that these values are selected in a manner to allow for some hysteresis in switching into and out of the buck-boost mode. It is also noted that Toff_bk may be used instead of Ton_bk, and then the comparison to the buck threshold becomes if Toff_bk is less than the buck threshold. Likewise, Toff_bst may be used instead of Ton_bst, and then the comparison to the boost threshold becomes if Toff_bst is greater than the boost threshold.

In the buck-boost converter 100, mode change is required to provide a constant system power rail from higher or lower input voltages. In some implementations, an analog comparator is used to compare Vin and Vout to change the mode or two complex control loops are used for each mode. It some implementations, the buck-boost converter always operates in a single mode, and the four switches are switching continuously to avoid a mode change. But this result in lower efficiency or high Vout ripple. To overcome this, the buck-boost converter 100 disclosed herein uses a new method of changing its mode by detecting specific switching time duration values associated with each mode.

Figure 6:
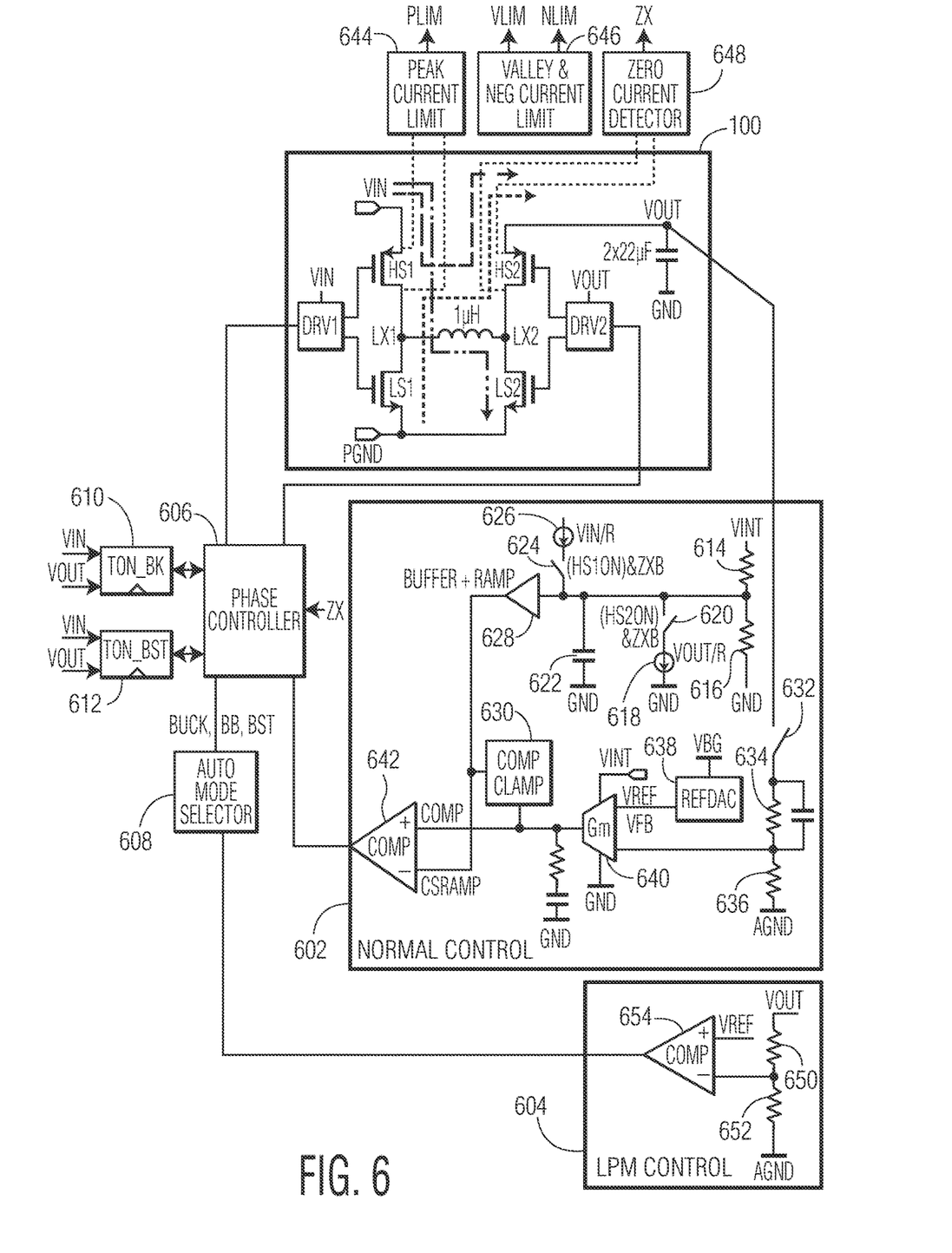
FIG. 6 illustrates buck-boost converter along with its controllers.

FIG. 6 illustrates buck-boost converter along with its controllers. The phase controller 606 produces two phase control signals that drive driver DRV1 102 and driver DRV2 104. The phase controller 606 receives inputs from auto mode selector 608, TON_BK generator 610, TON_BST generator 612, normal controller 602, LPM controller 604, and zero current detector 648. The phase controller 606 produces a first driver control signal that is output to DRIV1 102 and second control driver signal that is output to DRIV2 104.

The zero current detector 648 monitors the current though switching transistor HS2 108 to determine if that current goes to zero. The zero current detector 648 outputs the signal ZX that is received by the phase controller 606. The peak current limit detector 644 determines a peak current through switching transistor HS1 106. The valley and negative current limit detector 646 determines the valley current limit and negative current limits, VLIM and NLIM respectively. The TON_bk generator 610 receives Vin and Vout and changes the value of TON_bk adaptively. Likewise, the TON_bst generator 612 receives Vin and Vout and changes the value of TON_bst adaptively.

The normal controller 602 produces a control signal that is based upon a comparison between current sense plus ramp signal CSRAMP and a compensation signal COMP (related to the error of Vout). A switch 632 connects Vout to a voltage divider including resistor 634 and resistor 636 to produce a voltage VFB that is input into a Gm amplifier 640. A reference digital-to-analog converter (REFDAC) 638 produces a reference voltage VREF that is also input into Gm amplifier 640. The Gm amplifier 640 produces a current based upon a voltage difference between its inputs. The output of the Gm amplifier 640 is COMP. A resistor 614 and resistor 616 produce a DC bias of the current sense signal that is connected to the input of buffer 628. Switch 620, switch 624, current source 618, current source 626, and capacitor 622 is for indirect inductor current sensing. It duplicates the inductor current by current based on VIN or VOUT that is charging and discharging the capacitor 622 depending on the switching sequence such as PI1, PI2, . . . CS is creased by switch 620, switch 624, current source 618, current source 626, and capacitor 622. Then a RAMP signal is added inside of buffer 628.

The LPM controller 604 compares a reference voltage to Vout that is voltage divided by resistor 650 and resistor 652 using comparator 654. The comparator 654 produces a controls signal input into phase controller 606.

The auto mode selector 608 automatically determines the mode of operation of the buck-boost converter 100. The auto mode selector 608 receives TON_bk, TON_bst, and TPI3. When buck-boost converter 100 is in buck mode, auto mode selector 608 determines if TON_bk is greater than a buck mode threshold and is working the minimum off-time. If so, then the auto mode selector 608 switches operation to buck-boost mode. If not, then the auto mode selector 608 does not indicate any mode change. When buck-boost converter 100 is in boost mode, auto mode selector 608 determines if TON_bst is less than a boost mode threshold. If so, then the auto mode selector 608 switches operation to buck-boost mode. If not, then the auto mode selector 608 does not indicate any mode change. The boost mode threshold is based upon minimum on-time during the boost mode. When buck-boost converter 100 is in buck-boost mode, auto mode selector 608 compares TPI3 to a first buck-boost threshold and a second buck-boost threshold. If TPI3 is less than the first buck-boost threshold and greater than the second buck-boost, then the auto mode selector 608 does not indicate any mode change. If TPI3 is greater than the first buck-boost threshold, then the auto mode selector 608 switches operation to buck mode. If TPI3 is less than the second buck-boost threshold, then the auto mode selector 608 switches operation to boost mode.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A buck-boost converter controller configured to control a buck-boost controller, wherein the buck-boost converter has a buck mode of operation, a boost mode of operation, and a buck-boost mode of operation, comprising:

a phase controller configured to produce phase control signals to control switching in the buck-boost converter, wherein the phase control signals are based on a mode of operation of the buck-boost converter; and an automatic mode selector configured to indicate to the phase controller the mode of operation of the buck-boost controller based upon a buck on-time TON_bk or a buck off-time TOFF_bk, a boost on-time TON_bst or a boost off-time TOFF_bst, and a control configuration on-time TPI3, wherein TON_bk is an on-time during the buck mode of operation, TOFF_bk is the off-time during the buck mode operation, TON_bst is an on-time during the boost mode of operation, TOFF_bk is the off-time during the boost mode operation, and TPI3 is a time where a second high-side transistor is on and a first low side transistor is on.

2. The buck-boost converter controller of claim 1, wherein the automatic mode selector is configured to indicate a change from the buck mode to the buck-boost mode when TON_bk is greater than a buck mode threshold or TOFF_bk is less than the buck mode threshold.

3. The buck-boost converter controller of claim 1, wherein the automatic mode selector is configured to indicate a change from the boost mode to the buck-boost mode when TON_bst is less than a boost mode threshold or TOFF_bk is greater than the boost mode threshold.

4. The buck-boost converter controller of claim 1, wherein the automatic mode selector is configured to indicate a change from the buck-boost mode to the buck mode when TPI3 is greater than a first buck-boost mode threshold.

5. The buck-boost converter controller of claim 1, wherein the automatic mode selector is configured to indicate a change from the buck-boost mode to the boost mode when TPI3 is less than a second buck-boost mode threshold.

6. The buck-boost converter controller of claim 1, wherein the automatic mode selector is configured to:
indicate a change from the buck mode to the buck-boost mode when TON_bk is greater than a buck mode threshold or TOFF_bk is less than the buck mode threshold;
indicate a change from the boost mode to the buck-boost mode when TON_bst is less than a boost mode threshold or TOFF_bst is greater than the boost mode threshold;
indicate a change from the buck-boost mode to the buck mode when TPI3 is greater than a first buck-boost mode threshold; and
indicate a change from the buck-boost mode to the boost mode when TPI3 is less than a second buck-boost mode threshold.

7. The buck-boost converter controller of claim 1, further comprising:
a TON_bk generator configured to generate a value of TON_bk based upon an input voltage (Vin) of the buck-boost controller and an output voltage (Vout) of the buck-boost controller; and
a TON_bst generator configured to generate a value of TON_bst based upon Vin and Vout.

8. A buck-boost converter having a buck mode of operation, a boost mode of operation, and a buck-boost mode of operation, comprising:
an H-bridge including a first high-side transistor (HS1), a first low-side transistor (LS1), a second high-side transistor (HS2), and a second low-side transistor (LS1);
a first driver configured to drive HS1 and LS1;
a second driver configured to drive HS2 and LS2;
a phase controller configured to produce phase control signals including a first driver control signal and a second driver control signal to control switching of HS1, LS1, HS2, and LS2, wherein the phase control signals are based on a mode of operation of the buck-boost converter; and
an automatic mode selector configured to indicate to the phase controller the mode of operation of the buck-boost controller based upon a buck on-time TON_bk or a buck off-time TOFF_bk, a boost on-time TON_bst or boost off-time TOFF_bst, and a control configuration on-time TPI3, wherein TON_bk is an on-time during the buck mode of operation, TOFF_bk is the off-time during the buck mode operation, TON_bst is an on-time during the boost mode of operation, TOFF_bk is the off-time during the boost mode operation, and TPI3 is a time where the HS2 is on and the LS1 is on.

9. The buck-boost converter of claim 8, wherein the automatic mode selector is configured to indicate a change from the buck mode to the buck-boost mode when TON_bk is greater than a buck mode threshold or TOFF_bk is less than the buck mode threshold.

10. The buck-boost converter of claim 8, wherein the automatic mode selector is configured to indicate a change from the boost mode to the buck-boost mode when TON_bst is less than a boost mode threshold of TOFF_bst is greater than the boost mode threshold.

11. The buck-boost converter of claim 8, wherein the automatic mode selector is configured to indicate a change from the buck-boost mode to the buck mode when TPI3 is greater than a first buck-boost mode threshold.

12. The buck-boost converter of claim 8, wherein the automatic mode selector is configured to indicate a change from the buck-boost mode to the boost mode when TPI3 is less than a second buck-boost mode threshold.

13. The buck-boost converter of claim 8, wherein the automatic mode selector is configured to:
indicate a change from the buck mode to the buck-boost mode when TON_bk is greater than a buck mode threshold or TON_bk is less than the buck mode threshold;
indicate a change from the boost mode to the buck-boost mode when TON_bst is less than a boost mode threshold or TOFF_bst is greater than the boost mode threshold;
indicate a change from the buck-boost mode to the buck mode when TPI3 is greater than a first buck-boost mode threshold; and
indicate a change from the buck-boost mode to the boost mode when TPI3 is less than a second buck-boost mode threshold.

14. The buck-boost converter of claim 8, further comprising:
a TON_bk generator configured to generate a value of TON_bk based upon an input voltage (Vin) of the buck-boost controller and an output voltage (Vout) of the buck-boost controller; and
a TON_bst generator configured to generate a value of TON_bst based upon Vin and Vout.

15. A method for controlling a buck-boost converter, wherein the buck-boost converter has a buck mode of operation, a boost mode of operation, and a buck-boost mode of operation, comprising:
producing phase control signals, by a phase controller, to control switching in the buck-boost converter, wherein the phase control signals are based on a mode of operation of the buck-boost converter; and
indicating to the phase controller the mode of operation of the buck-boost controller based upon a buck on-time TON_bk or a buck off-time TOFF_bk, a boost on-time TON_bst or a boost off-time TOFF_bst, and a control configuration on-time TPI3, wherein TON_bk is an on-time during the buck mode of operation, TOFF_bk is the off-time during the buck mode operation, TON_bst is an on-time during the boost mode of operation, TOFF_bk is the off-time during the boost mode operation, and TPI3 is a time where a second high-side transistor is on and a first low side transistor is on.

16. The method of claim 15, further comprises indicating a change from the buck mode to the buck-boost mode when TON_bk is greater than a buck mode threshold or TOFF_off is less than the buck mode threshold.

17. The method of claim 15, further comprises indicating a change from the boost mode to the buck-boost mode when TON_bst is less than a boost mode threshold or TOFF_bst is greater than the boost mode threshold.

18. The method of claim 15, further comprises indicating a change from the buck-boost mode to the buck mode when TPI3 is greater than a first buck-boost mode threshold.

19. The method of claim 15, further comprises indicating a change from the buck-boost mode to the boost mode when TPI3 is less than a second buck-boost mode threshold.

20. The method of claim 15, further comprising:
indicating a change from the buck mode to the buck-boost mode when TON_bk is greater than a buck mode threshold or TOFF_bk is less than the buck mode threshold;
indicating a change from the boost mode to the buck-boost mode when TON_bst is less than a boost mode threshold or TON_bst is greater than the boost mode threshold;
indicating a change from the buck-boost mode to the buck mode when TPI3 is greater than a first buck-boost mode threshold; and
indicating a change from the buck-boost mode to the boost mode when TPI3 is less than a second buck-boost mode threshold.

* * * * *